(12) United States Patent
Liao

(10) Patent No.: US 6,719,319 B2
(45) Date of Patent: Apr. 13, 2004

(54) COLLAPSING DEVICE FOR THE THIRD WHEEL OF A GOLF CART

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 25 days.

(21) Appl. No.: 10/041,093

(22) Filed: Dec. 28, 2001

(65) Prior Publication Data

US 2003/0122353 A1 Jul. 3, 2003

(51) Int. Cl.[7] .............................. B62B 1/00; B62B 3/00; F16D 1/12; B62D 61/06
(52) U.S. Cl. ..................... 280/654; 280/651; 280/62; 280/767; 280/DIG. 6; 403/83
(58) Field of Search ................................ 280/654, 651, 280/655, 646, 645, 47.34, 47.27, 47.24, 43.1, DIG. 6, 62, 767; D34/15; 403/83, 84

(56) References Cited

U.S. PATENT DOCUMENTS

| | | | | | |
|---|---|---|---|---|---|
| 2,856,195 | A | * | 10/1958 | Ziebarth | 280/43 |
| 3,017,710 | A | * | 1/1962 | Carlson | 37/434 |
| 3,362,725 | A | * | 1/1968 | Dolphin | 280/287 |
| 5,312,006 | A | * | 5/1994 | Lag | 211/195 |
| 5,526,894 | A | * | 6/1996 | Wang | 180/65.1 |
| 5,709,400 | A | * | 1/1998 | Bonnier et al. | 280/650 |
| 5,876,057 | A | * | 3/1999 | Huang | 280/642 |
| 6,099,020 | A | * | 8/2000 | Liao | 280/643 |
| 6,131,917 | A | * | 10/2000 | Walsh | 280/DIG. 6 |
| 6,296,260 | B1 | * | 10/2001 | Schiavone | 280/47.2 |

* cited by examiner

*Primary Examiner*—Brian L. Johnson
*Assistant Examiner*—G B Klebe
(74) *Attorney, Agent, or Firm*—Bacon & Thomas (57) ABSTRACT

A collapsing device for the third wheel of a golf cart includes a fixing base, a wheel frame, and a pin. The fixing base is U-shaped to form an interior hollow for the sleeve to fit in, having an insert groove respectively in each sidewall. The wheel frame has its bottom assembled with a third wheel, and its top provided with a slide groove at opposite sides and a through hole pivotally combined with a sleeve. The pin is inserted in the slide groove, having both ends protruding out of the slide sleeve and its intermediate portion clasped by a spring, which has its other end connected with a cover member fixedly mounted on the wheel frame. Thus, the pin is pulled by the spring and stuck in the upper or the lower insert groove for stabilizing the third wheel in the collapsed or the expanded condition.

2 Claims, 14 Drawing Sheets

COLLAPSING DEVICE FOR THE THIRD WHEEL OF A GOLF CART

BACKGROUND OF THE INVENTION

This invention relates to a collapsing device for the third wheel of a golf cart, particularly to one that enlarges a triangular area by stretching outward the third wheel when the golf cart is expanded for use, enabling the golf cart with a club bag to move comparatively smoothly and steadily.

Figure 1:
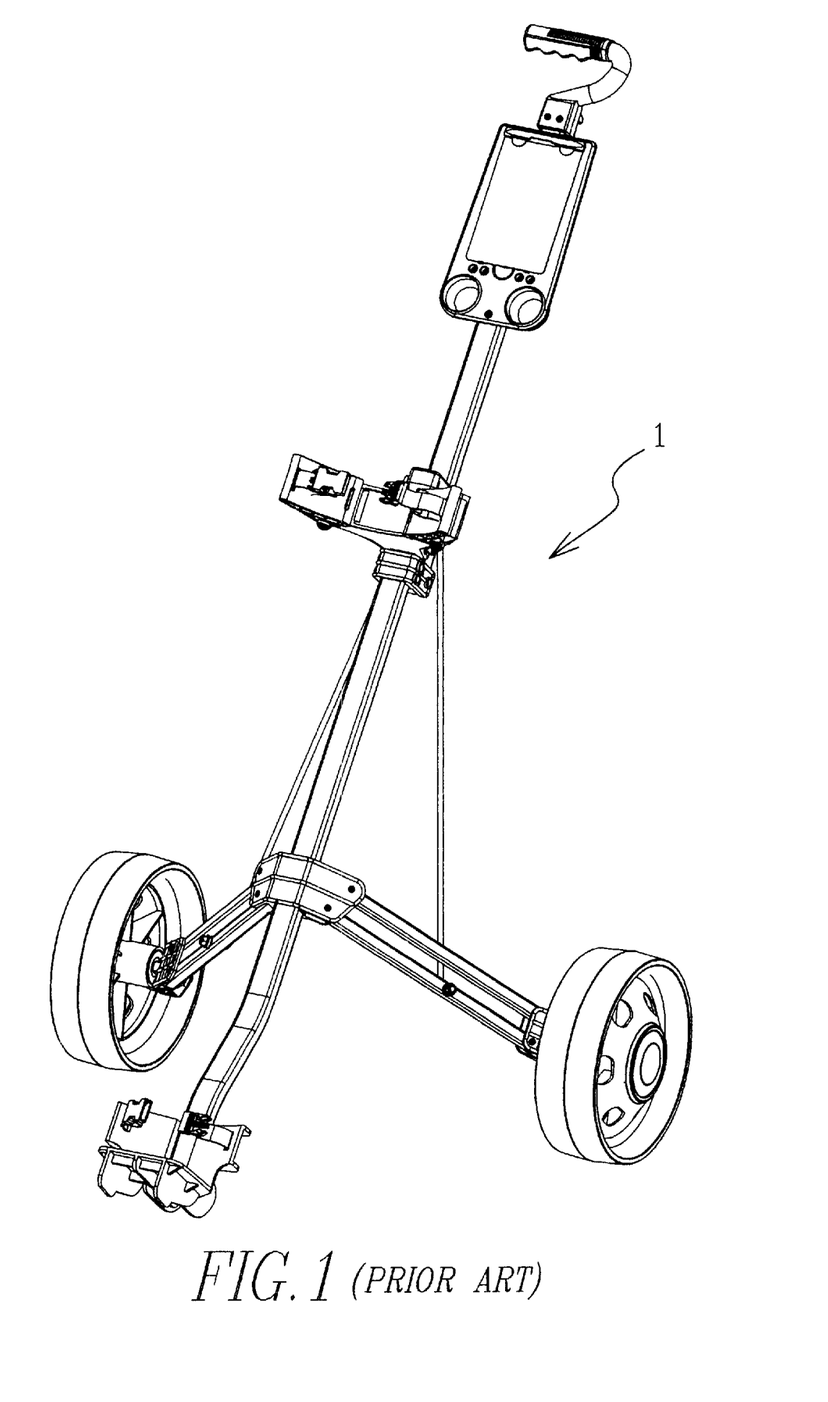
FIG. 1 is a perspective view of a conventional golf cart.

In general, a conventional golf cart 1, as shown in FIG. 1, is designed to have two wheels moved forward by pulling for transporting a club bag. But pulling a golf cart over an uneven golf course for a long time can easily render a puller's arm sore, aching or numb.

Figure 2:
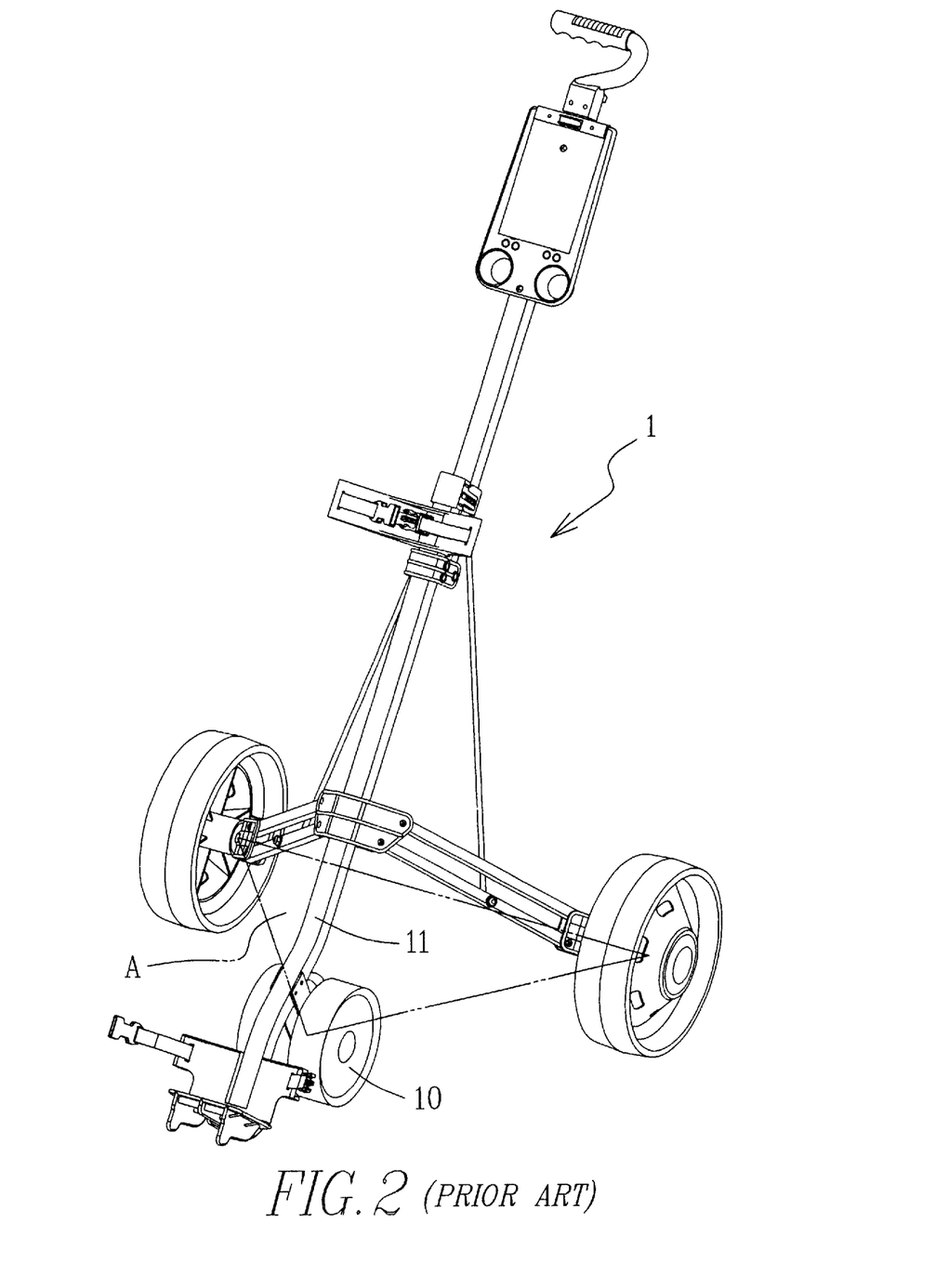
FIG. 2 is a perspective view of another conventional golf cart.

To improve the cart, a conventional golf cart 1 is provided with a third wheel 10, as shown in FIG. 2, so that the golf cart can not only be pulled but also pushed, saving labor when moving the golf cart back and forth. However, the third wheel 10 of such a golf cart 1 is fixedly secured behind the lower tube of the cart frame; therefore the triangular area formed by the three wheels on the ground is relatively small, and the golf cart can be easily overturned when carrying a club bag and moving on an uneven golf course.

SUMMARY OF THE INVENTION

The main objective of this invention is to offer a collapsing device for the third wheel of a golf cart that is not likely to affect an originally collapsed size of a golf cart, but one that can enlarge a triangular area formed by the three wheels on the ground when the golf cart is expanded for use, and its third wheel is stretched outward in front of the lower tube of the cart, permitting the golf cart with a club bag to move more smoothly and steadily than a conventional golf cart.

Another objective of this invention is to offer a third wheel of a golf cart which can not only be folded backward, but which also has shock absorption capability, letting the golf cart move with steadiness when either pushed or pulled when its third wheel is extended.

BRIEF DESCRIPTION OF DRAWINGS

This invention will be better understood by referring to the accompanying drawings, wherein.

DETAILED DESCRIPTION OF THE PREFERRED EMBODIMENT

Figure 4:
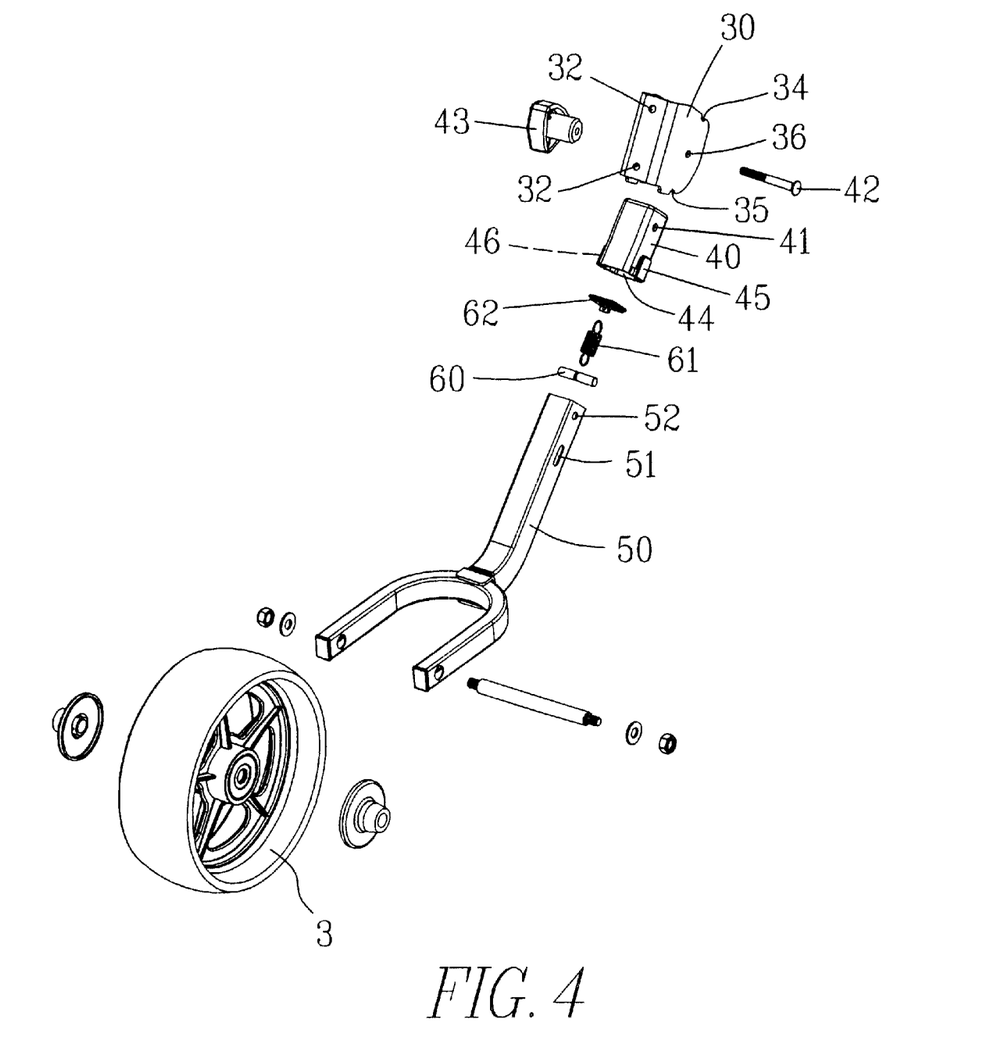
FIG. 4 is an exploded perspective view of the first embodiment of the collapsing device of the third wheel of a golf cart.
Figure 5:
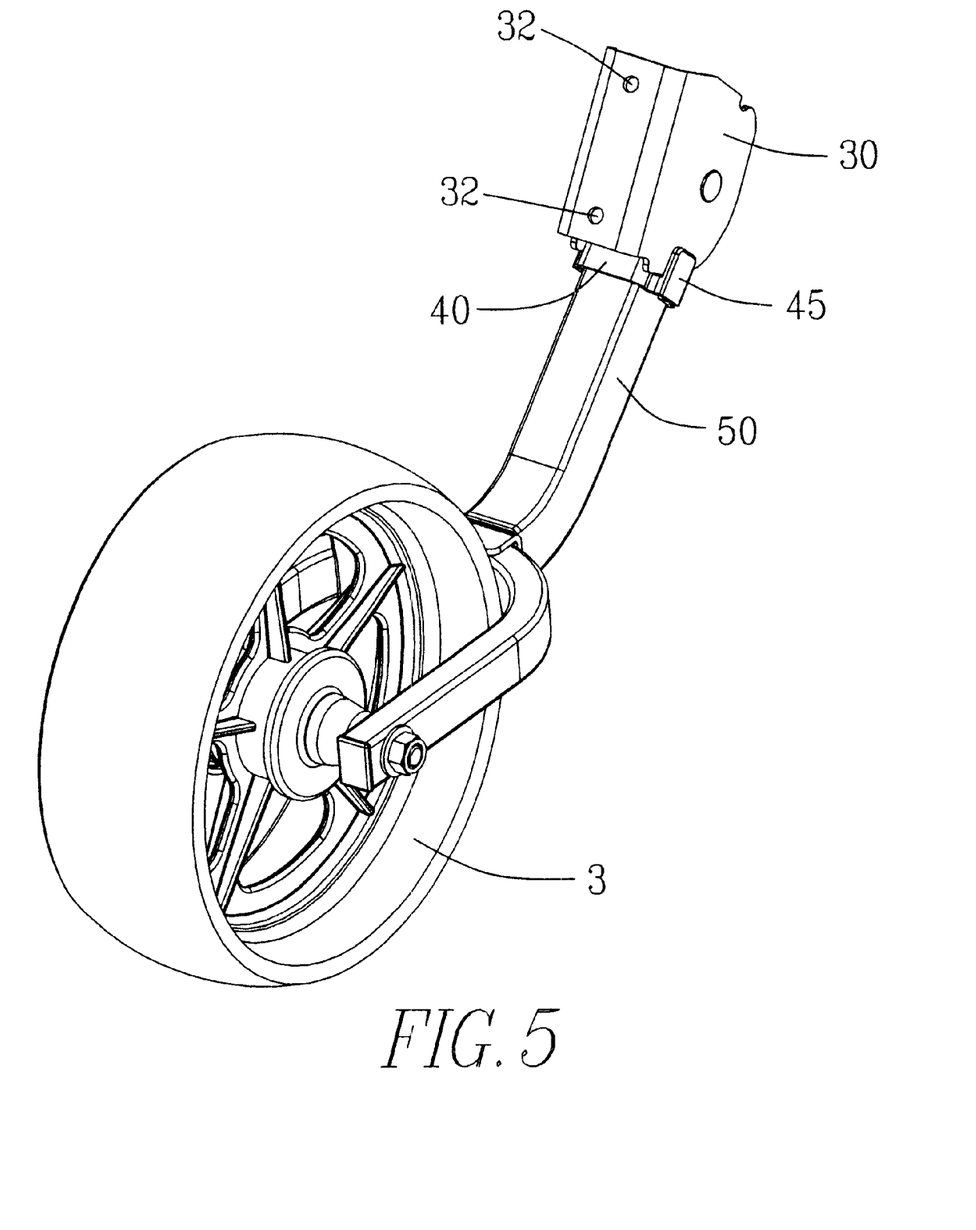
FIG. 5 is a perspective view of the first embodiment of the third wheel assembled.

A first embodiment of a collapsing device for the third wheel of a golf cart according to the present invention, as shown in FIG. 4, includes a fixing base 30, a sleeve 40, a wheel frame 50 and a pin 60 as main components.

The fixing base 30 is formed with a U-shaped body having a lateral opening. The wall surface facing the opening of the body is provided with locking holes 32 to be fastened with a lower tube 33 under the cart frame 50. Each side wall of the fixing base 30 has an upper and a lower insert groove 34, 35 respectively formed at the top and the bottom edge, and a through hole 36 bored in the center portion.

Figure 6:
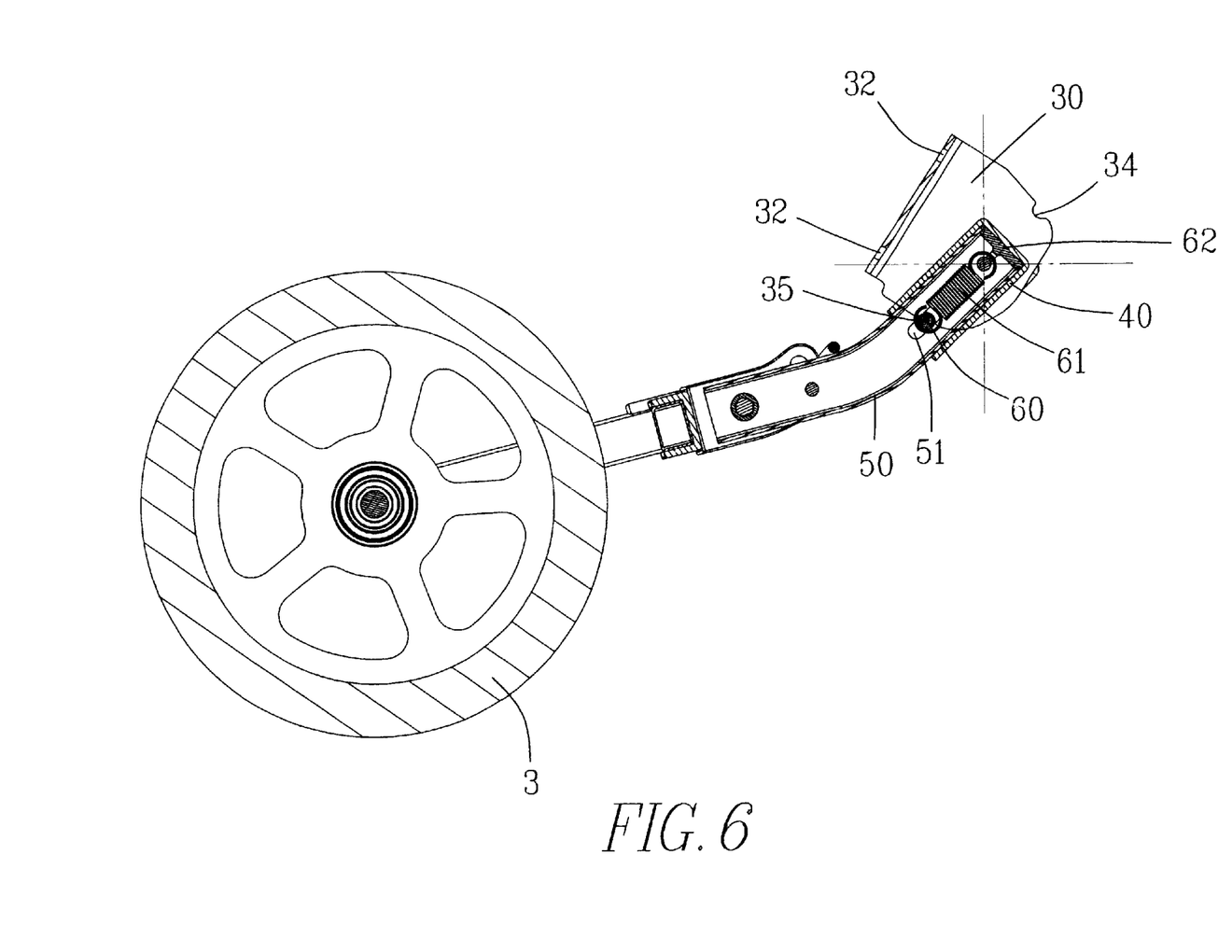
FIG. 6 is a side cross-sectional view of the first embodiment of the third wheel stretched outward.

The sleeve 40 has two pivotal holes 41 provided on opposite sides aligned to the through holes 36 of the fixing base 30. Thus, the sleeve 40 can be fitted in the interior space of the fixing base 30, as shown in FIG. 6, and can sway freely therein after a bolt 42 is inserted through the through holes 36 of the fixing base 30 and further through pivotal holes 41 of the sleeve 40 and then fastened with a nut 43. Moreover, the sleeve 40 has a sleeve groove 44 formed at the bottom and two vertical wings 45 respectively provided on opposite sides of the opening of the sleeve groove 44, with each vertical wing 45 having a slot 46 in an inner wall.

The wheel frame 50 has its lower end axially assembled with a third wheel 3 and its upper end provided with a slide groove 51. A through hole 52 aligned with the pivotal holes 41 of the sleeve 40 is bored above the slide groove 51 to let the top end of the wheel frame 50 be pivotally assembled with the sleeve groove 44 of the sleeve 40.

The pin 60 is inserted in the slide groove 51 of the wheel frame 50, having both ends protruding out of the slide groove 51 and its intermediate portion connected or hooked to one end of a spring 61. The other end of the spring 61 is clasped with the bottom of a cover member 62 mounted fixedly on the top of the wheel frame 50 so that the pin 60 is always pulled upward by the spring 61 to push against the upper edge 5 of the slide groove 51, as shown in FIG. 7.

In handling, as the opposite ends of the pin 60 protrude out of the slots 46 of the sleeve 40 and push against the opposite side walls of the fixing base 30, when the pin 60 is moved along the side walls of the fixing base 30 and tightly stuck in the lower insert groove 35 of fixing base 30, the third wheel 3 of the golf cart can be stretched outward and together with the other two wheels forms a relatively large triangular area B on the ground (The triangular area B is much larger than the triangular area A shown in FIG. 2). In this position, the spring 61 between the pin 60 and the cover member 62 is in an expanded condition so that the pin 60 is secured in the lower groove 35 of the fixing base 30, as shown in FIG. 6.

Figure 7:
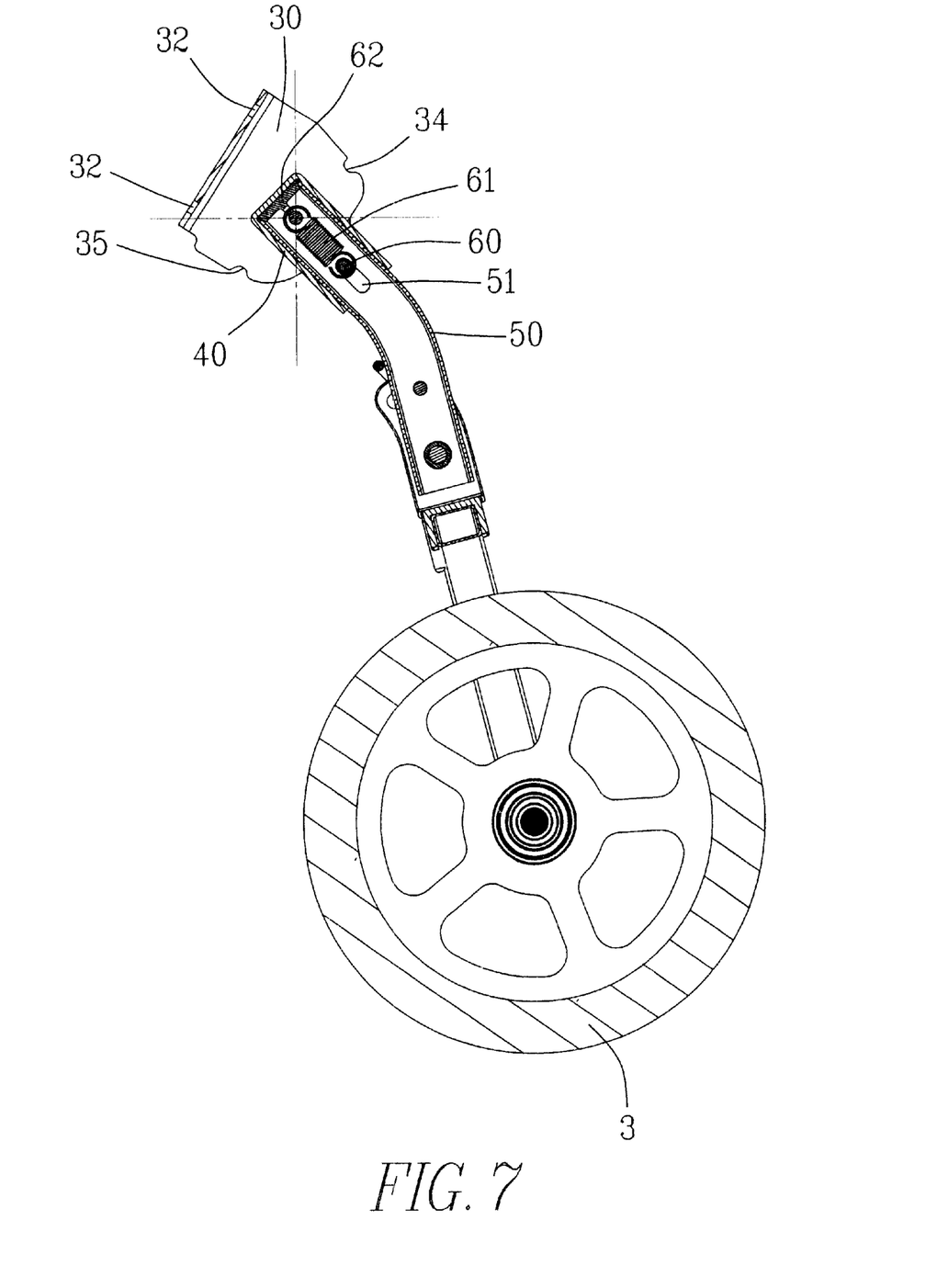
FIG. 7 is a side cross-sectional view of the first embodiment of the third wheel shifted to be collapsed.

When the wheel frame 50 is swung backward the pin 60 is disengaged from the lower insert groove 35 of the fixing base 30, as shown in FIG. 7, and the spring 61 will not be pulled any more. To fold the third wheel 3 of the golf cart, just swing the wheel frame 50 to let the pin 60 stick in the upper insert groove 34 of the fixing base 30 pull and expand the spring 61, thereby achieving an effect of folding backward the third wheel 3 for improved stability.

Further, when the third wheel 3 is folded for storing or stretched outward for use, it can also be tightly fastened by means of a nut 43 (preferably a triangular one that can be screwed by hand) and a bolt 42.

Figure 9:
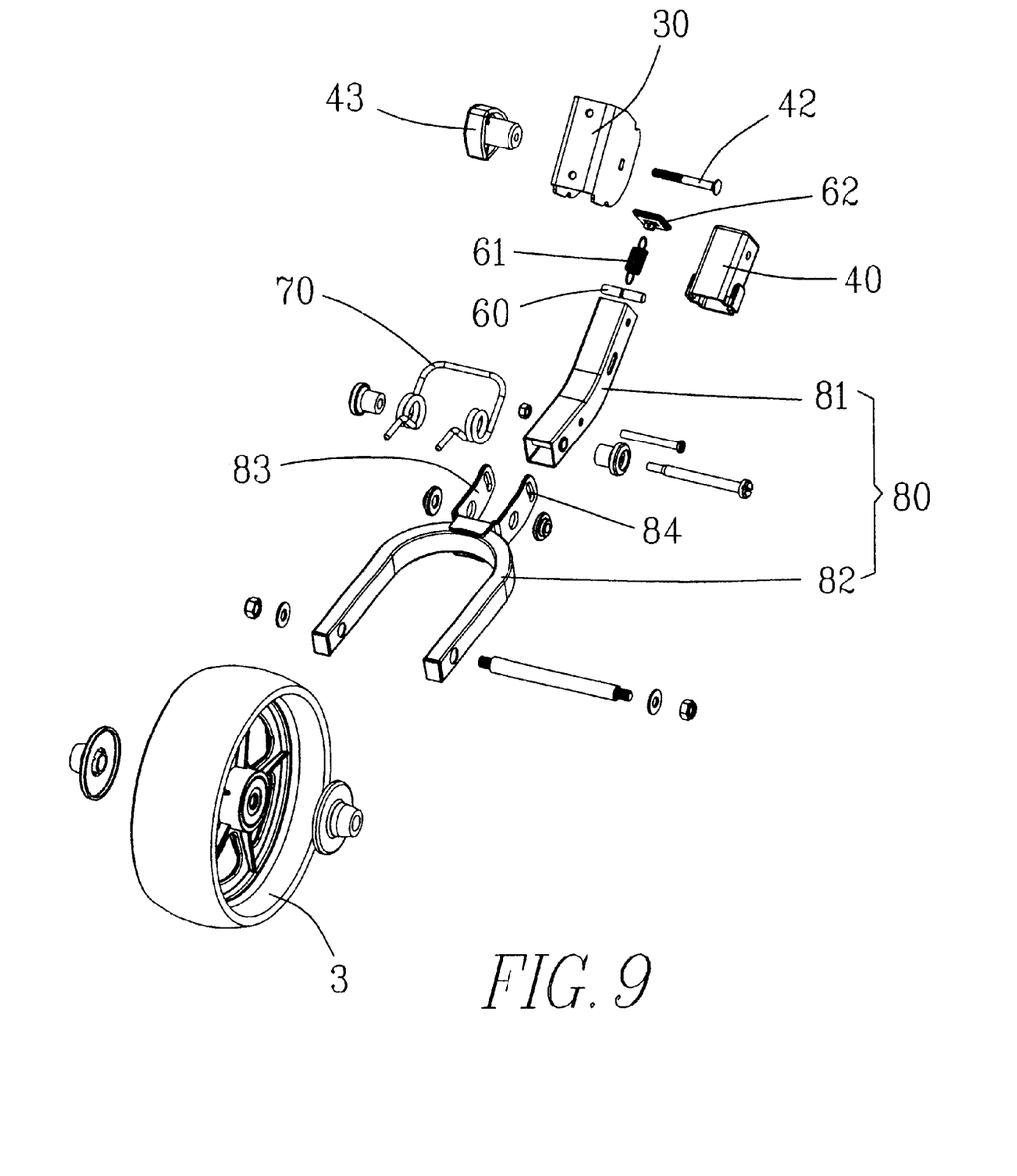
FIG. 9 is an exploded perspective view of a second embodiment of a collapsing device for the third wheel of a golf cart.
Figure 10:
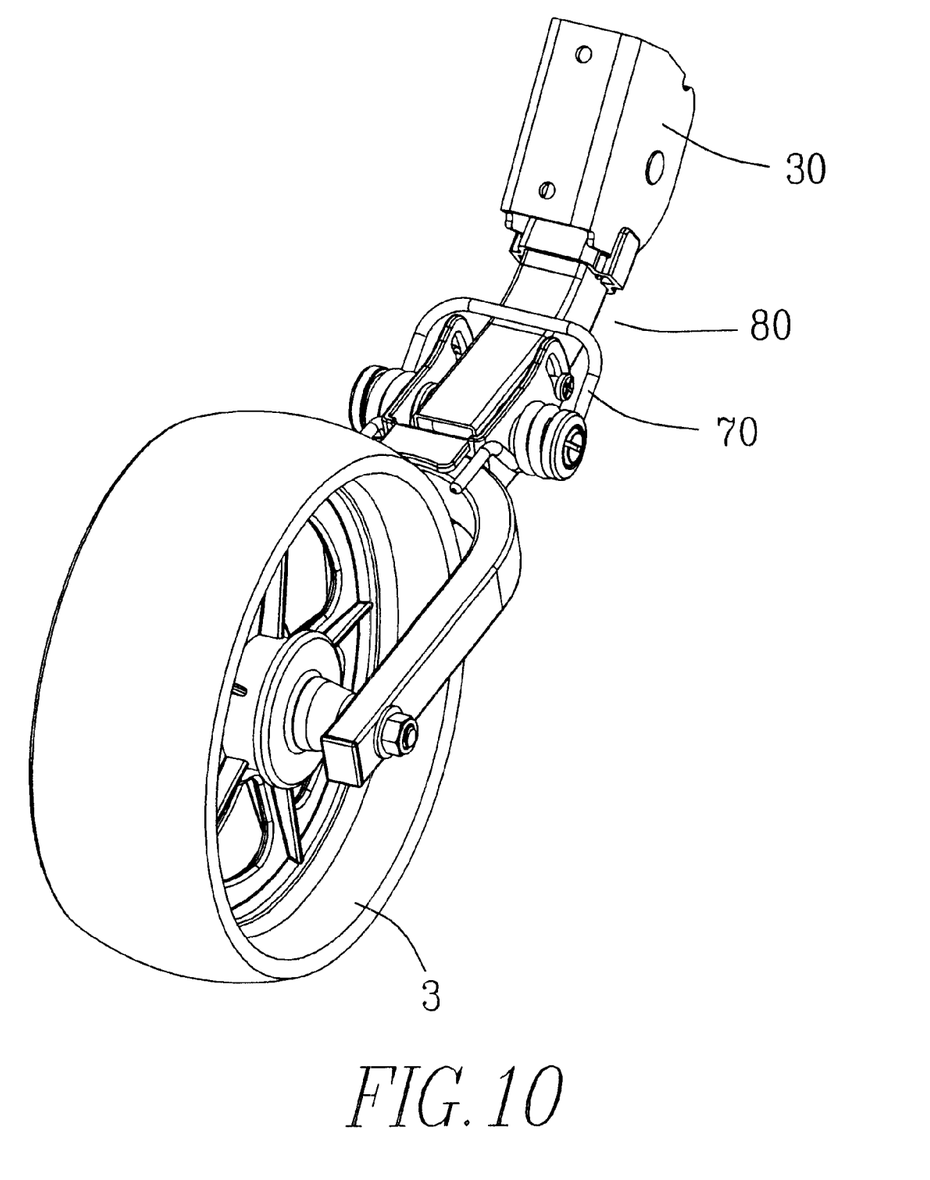
FIG. 10 is a perspective view of the second 20 embodiment of the collapsing device for the third wheel assembled.
Figure 11:
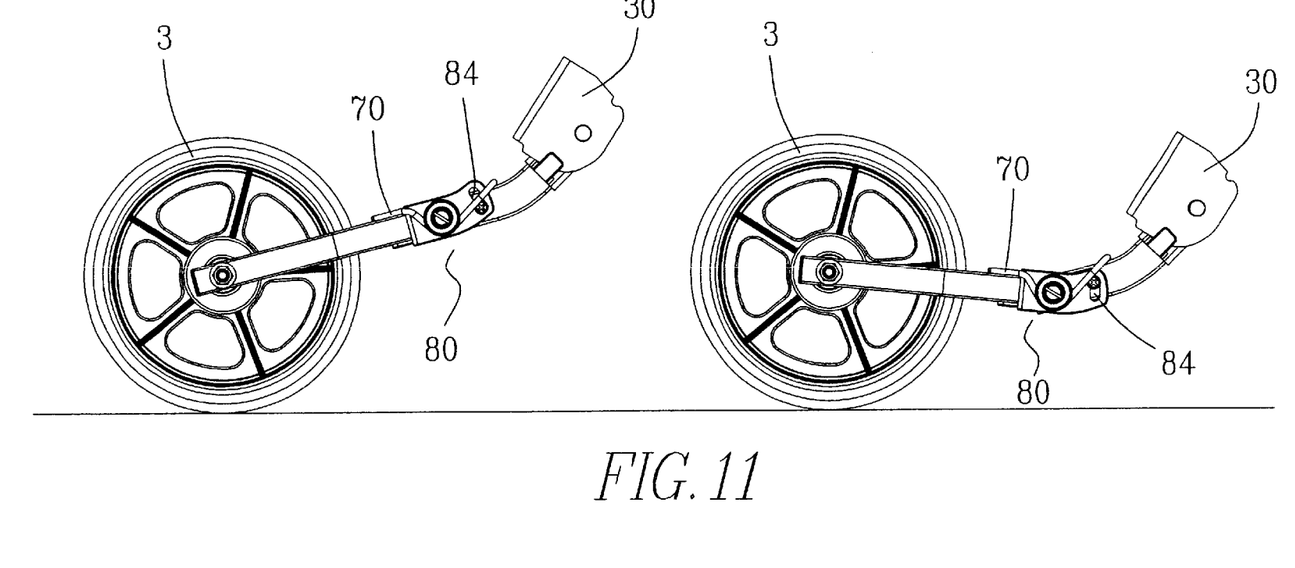
FIG. 11 is a side cross-sectional view of the second embodiment of the third wheel in a shock absorbing condition.

A second embodiment of a folding device for the third wheel of a golf cart according to the present invention, as shown in FIGS. 9 and 10, includes the same components as those mentioned in the first embodiment except an additional shock-absorbing resilient member 70 shaped as an inverted U and a wheel frame 80.

The wheel frame 80 comprises an upper wheel frame 81 and a lower wheel frame 82. The lower wheel frame 82 has its lower end axially assembled with a third wheel 3 and its upper end fixed with a pair of connecting plates 83 to be connected with the upper wheel frame 81. Each connecting plate 83 is provided with a slide groove 84 on top end for controlling a swaying angle of the lower wheel frame 82.

Figure 12:
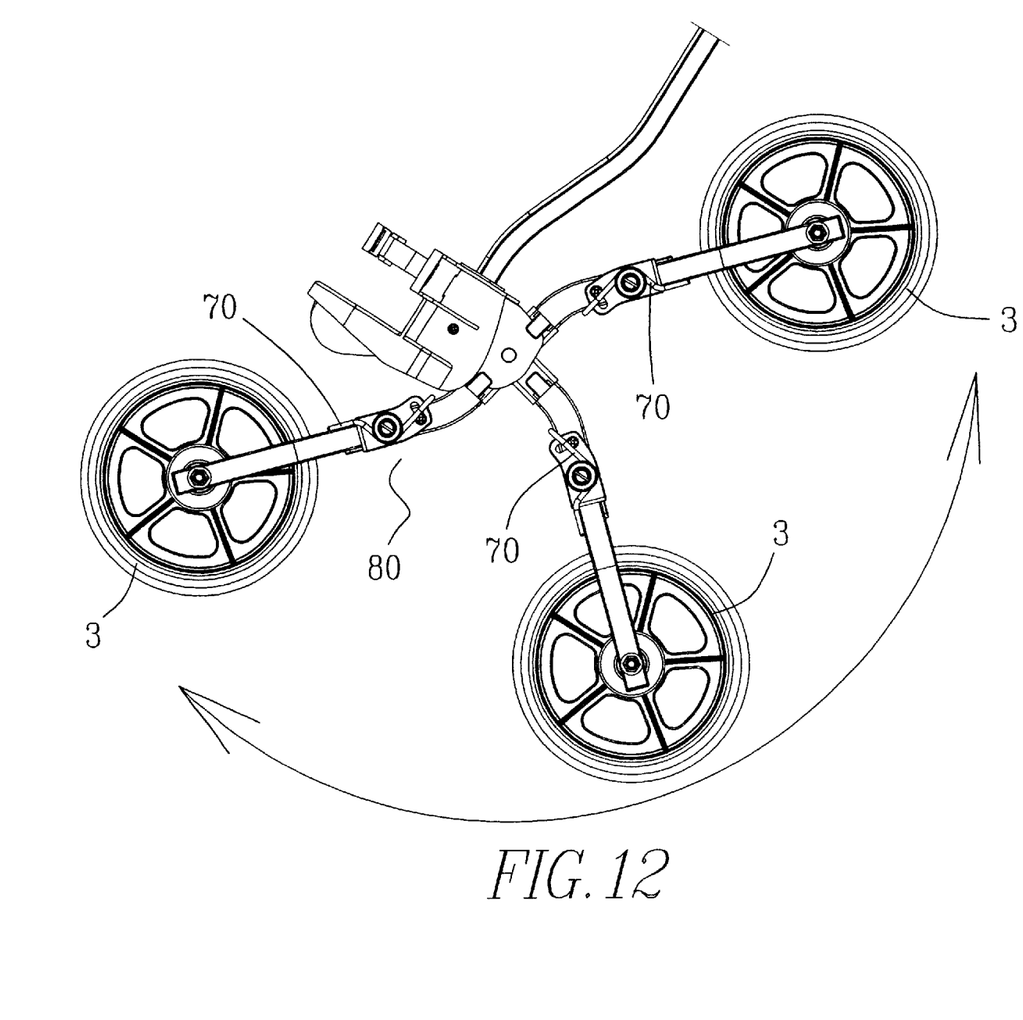
FIG. 12 is a side cross-sectional view of the second embodiment of the third wheel in a process of being collapsed and stretched.

In assembling, the shock-absorbing resilient member 70 is fixed between the upper wheel frame 81 and the lower wheel frame 82, with both ends pressing down the lower wheel frame 82, as shown in FIG. 10. Thus, the third wheel 3 being provided with the shock absorbing resilient member 70 could protect a user's hand from becoming sore or numb when pushing or pulling a golf cart to move on uneven ground for a long time. In addition, the third wheel 3 being provided with the shock-absorbing resilient member 70 can also be stretched outward and folded backward just as described in the first embodiment, as shown in FIG. 12.

As can be noted from the above description, this invention has the following advantages.

Figure 3:
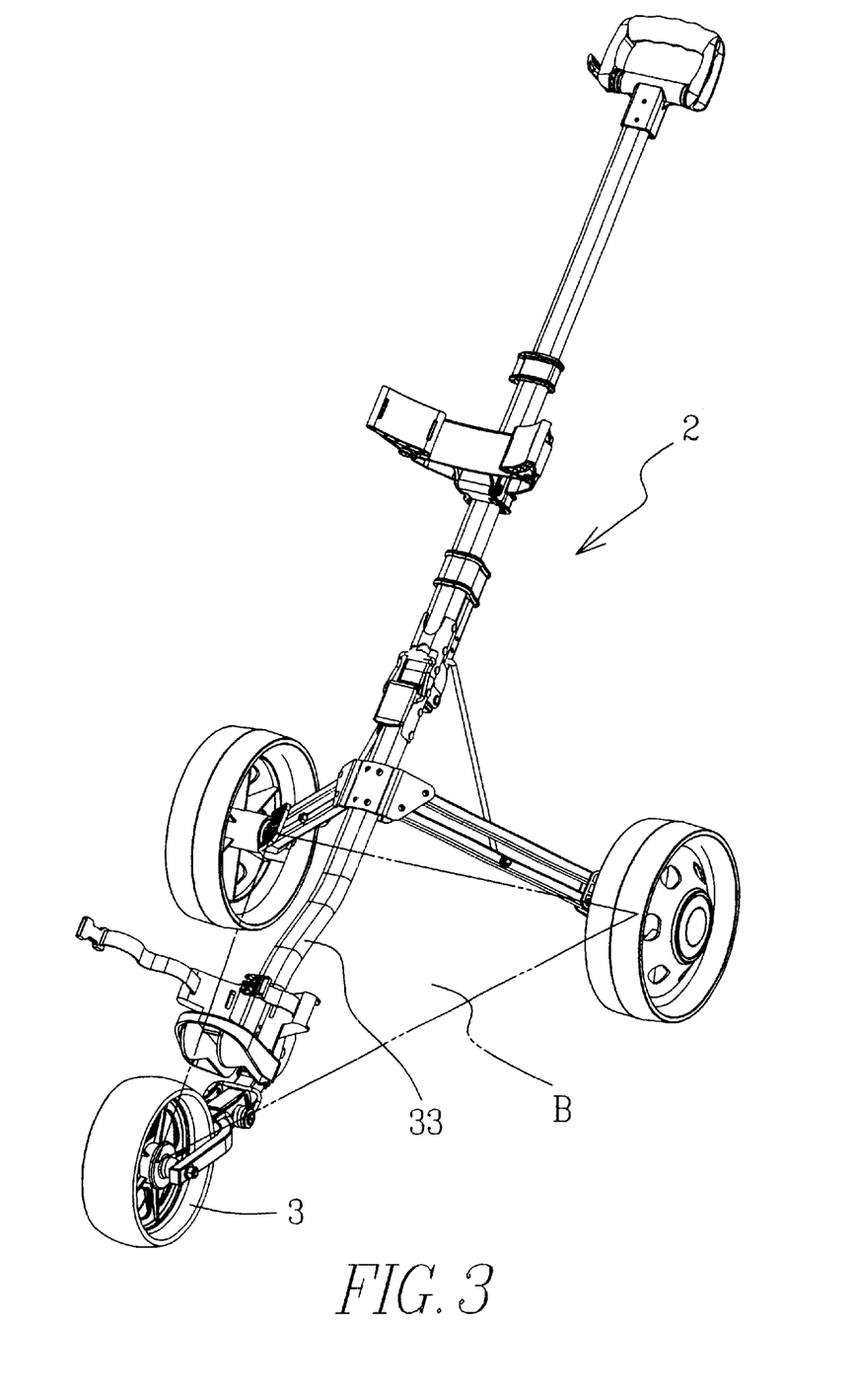
FIG. 3 is a perspective view of a golf cart with a first embodiment of a collapsing device for the third wheel according to the present invention.
Figure 13:
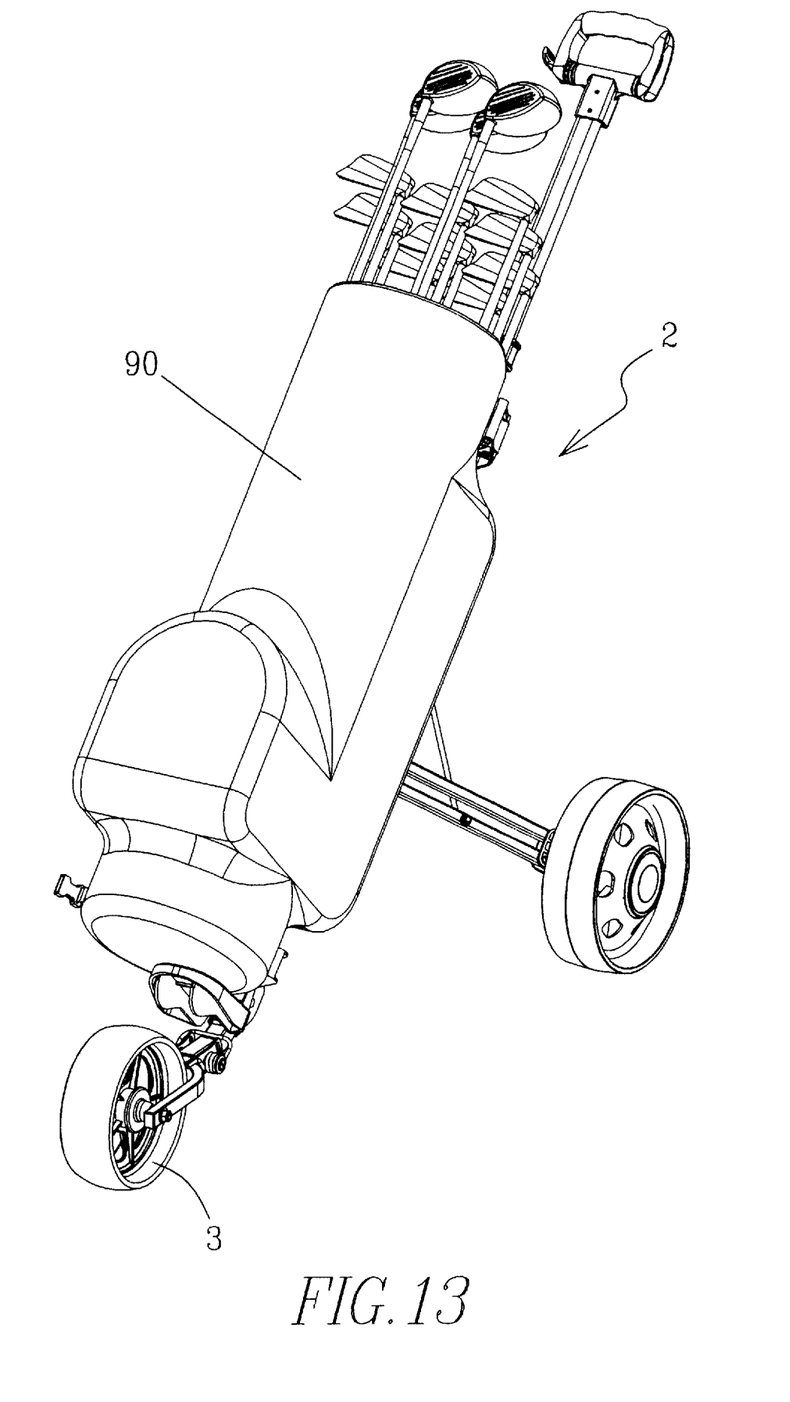
FIG. 13 is a perspective view of the embodiment of a golf cart with the collapsing device for the third wheel, carrying a club bag.

1. When the third wheel 3 is stretched outward and loaded with a club bag for use, as shown in FIG. 13, it together with the other two wheels forms a relatively large triangular area B on the ground, as shown in FIG. 3, greatly stabilizing the golf cart when it is pushed or pulled on uneven ground.

Figure 8:
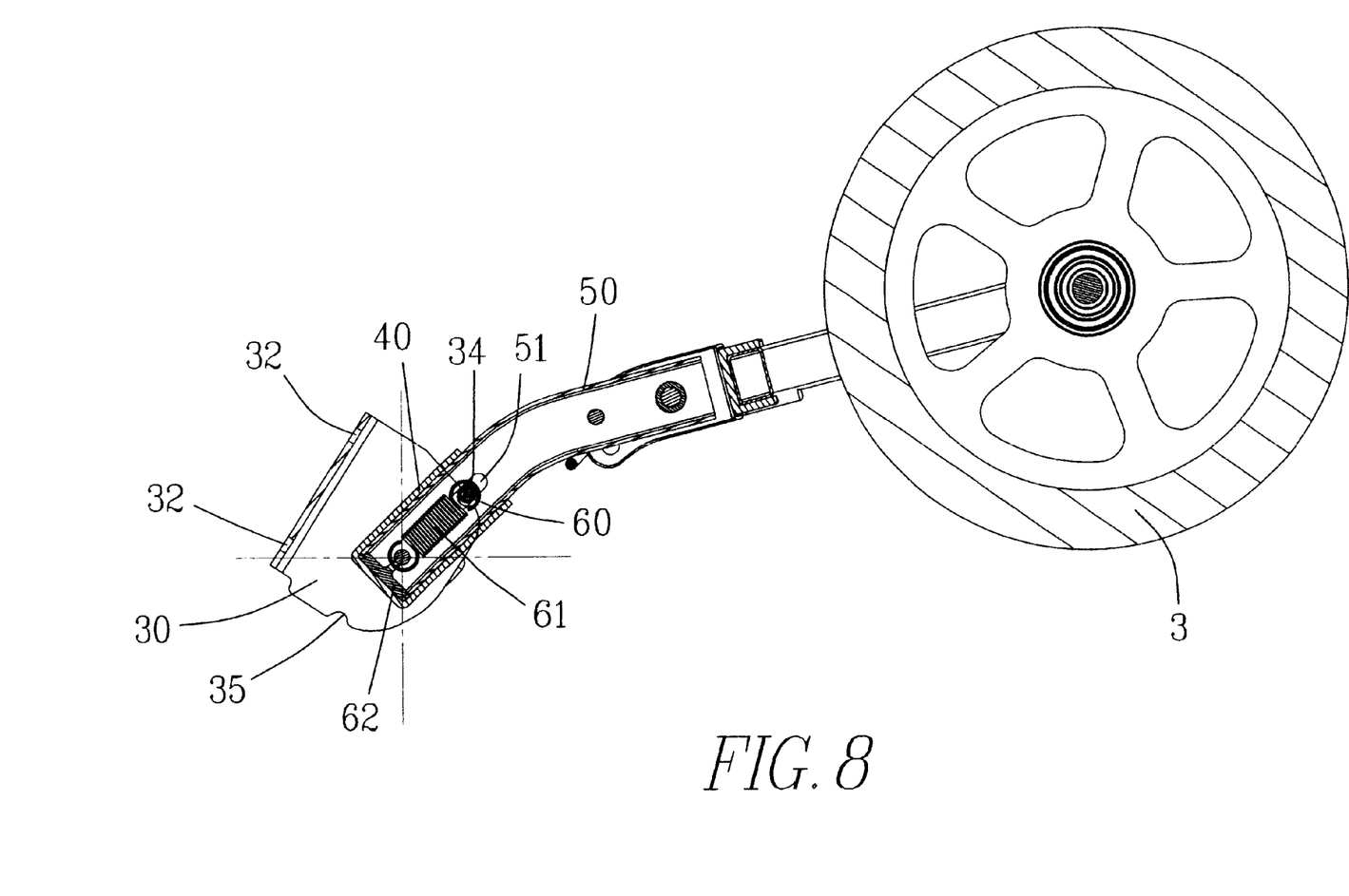
FIG. 8 is a side cross-sectional view of the first embodiment of the third wheel in the collapsed condition.
Figure 14:
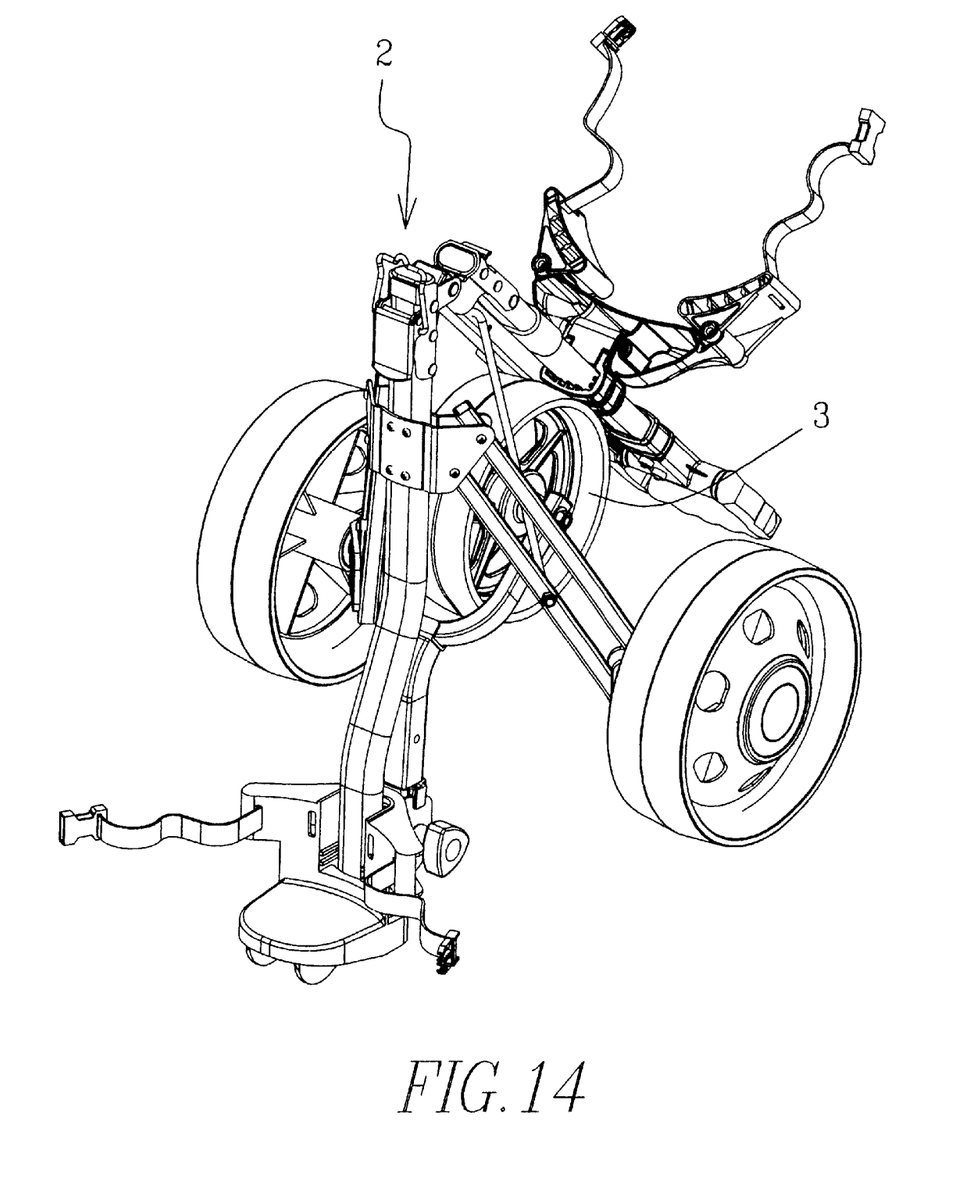
FIG. 14 is a perspective view of the embodiment of the golf cart with the collapsing device for the third wheel in the collapsed condition.

2. The third wheel 3 can be collapsed backward when not in use, as shown in FIGS. 8 and 10, and so can the whole cart, as shown in FIG. 14, reducing space for storing and packaging materials for transporting.

3. It is possible to stabilize the third wheel 3 whether it is stretched outward for use or collapsed backward for storing. The design of shock absorption means for the third wheel 3 makes a user feel comparatively comfortable when pushing and pulling a golf cart on uneven ground.

While the preferred embodiments have been described above, it will be recognized and understood that various modifications may be made therein and the appended claims are intended to cover all such modifications that may fall within the spirit and scope of the invention.

I claim:

1. A collapsing device for the third a wheel of a golf cart comprising:

a fixing base secured to a bottom end of a lower tube of a golf cart, said fixing base formed with a U-shaped body having an opening, said body having two side walls each provided with an insert groove in an upper end and a lower end, with insert grooves of said two side walls aligned to each other:

a sleeve pivotally fitted in said fixing base and formed with a sleeve groove at the bottom, said sleeve groove having a slot provided at opposite sides of an opening of said sleeve groove:

a wheel frame having its lower end axially assembled with a wheel and its upper end provided with a slide groove on opposite sides, a through hole provided above each said slide groove to be pivotally combined with said sleeve, said wheel frame having its top end inserted in said sleeve groove of said sleeve for moving together:

a pin inserted in said slide groove of said wheel frame and having both ends protruding out of said slide groove, said pin having an intermediate portion clasped by one end of a spring, said spring having a second end connected to a cover member fixedly mounted on the top of said wheel frame, said pin being urged by said spring to push against the upper edge of said slide groove: wherein said wheel is moved outward by said pin urged by said spring, said wheel together with two other wheels forming a large triangular area to stabilize said golf cart.

2. The collapsing device for a wheel of a golf cart as claimed in claim 1, wherein said sleeve is pivotally fitted in said fixing base by means of a bolt and a triangular nut so as to reinforce the stability of said wheel.

* * * * *